United States Patent [19]

Komoriya

[11] 4,216,701
[45] Aug. 12, 1980

[54] SWING TYPE HYDRAULIC SERVO-ACTUATOR

[75] Inventor: Kiyoshi Komoriya, Tokyo, Japan

[73] Assignees: Agency of Industrial Science & Technology; Ministry of International Trade & Technology, both of Tokyo, Japan

[21] Appl. No.: 888,410

[22] Filed: Mar. 20, 1978

[30] Foreign Application Priority Data

Mar. 25, 1977 [JP] Japan .................. 52-33044

[51] Int. Cl.² .............................................. F15B 9/10
[52] U.S. Cl. ........................................ 91/49; 91/51;
91/375 R; 91/376 A; 91/431
[58] Field of Search ............. 91/51, 49, 376 A, 375 R, 91/375 A, 431

[56] References Cited

U.S. PATENT DOCUMENTS

| | | | |
|---|---|---|---|
| 1,876,104 | 9/1932 | Tucker | 91/375 R |
| 2,628,684 | 2/1953 | Slatter et al. | 91/375 R |
| 3,066,653 | 12/1962 | Stiglic et al. | 91/375 R |
| 3,354,785 | 11/1967 | Sagawa | 91/49 |
| 3,499,752 | 3/1970 | Vermigs | 91/335 |

*Primary Examiner*—Paul E. Maslousky
*Attorney, Agent, or Firm*—Kurt Kelman

[57] ABSTRACT

A hydraulic servo-actuator has a casing embracing therein a hydraulic fluid chamber which is divided into two hydraulic drive chambers by a vane projecting from a first shaft. To each of the divided chambers are connected an oil feeding passage provided with a variable restrictor and intended for the feeding of pressurized oil and an oil discharge passage intended for the discharging of the pressurized oil. A second shaft is coaxially disposed relative to the first shaft, and the first and second shafts are correlated with each other in such a way that the relative rotary displacement occurring between the two shafts controls the aperture of the oil discharge passages communicating with the divided chambers. The difference between the static pressures which are consequently produced within the divided chambers because of the aperture of the oil discharge passages causes the vane to swing, making it possible to control the torque even when the vane is in the neighborhood of its neutral position. In addition, the variable restrictors provided in the oil feeding passages serve the purpose of regulating the amount of the pressurized oil to be fed. Hence, the hydraulic servo-actuator is capable of stably controlling the torque.

4 Claims, 14 Drawing Figures

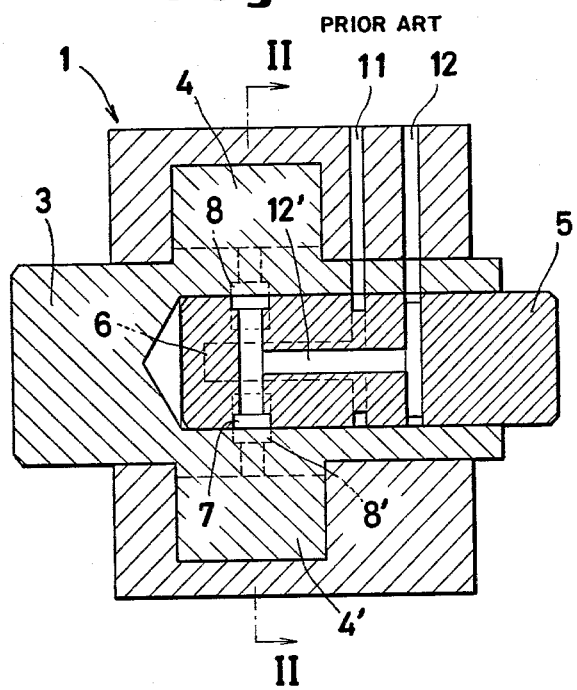
Fig_1 PRIOR ART
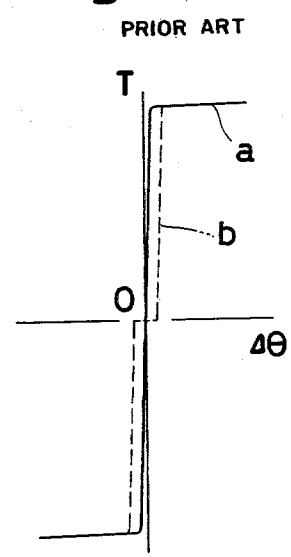
Fig_3 PRIOR ART
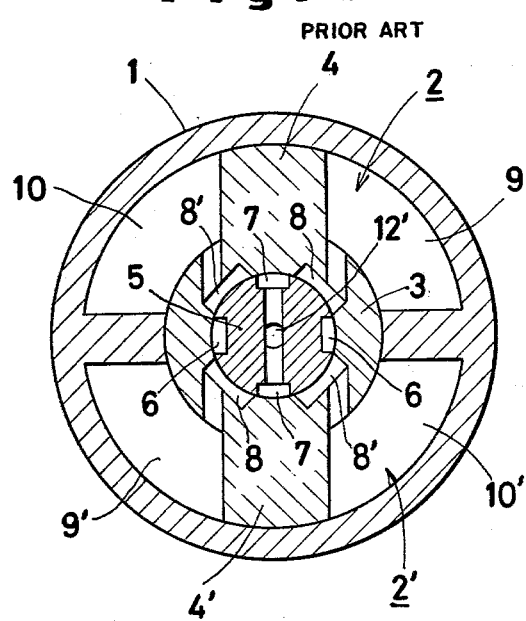
Fig_2 PRIOR ART
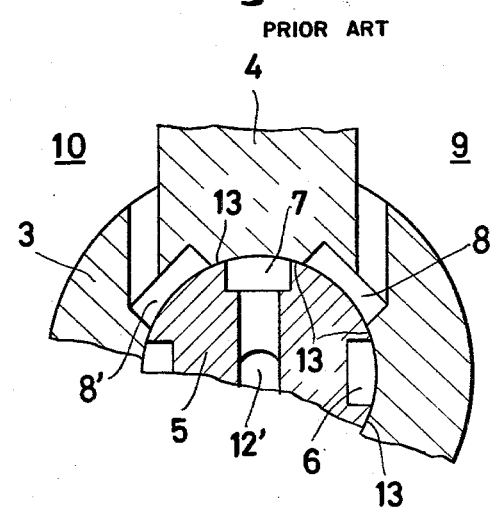
Fig_4 PRIOR ART

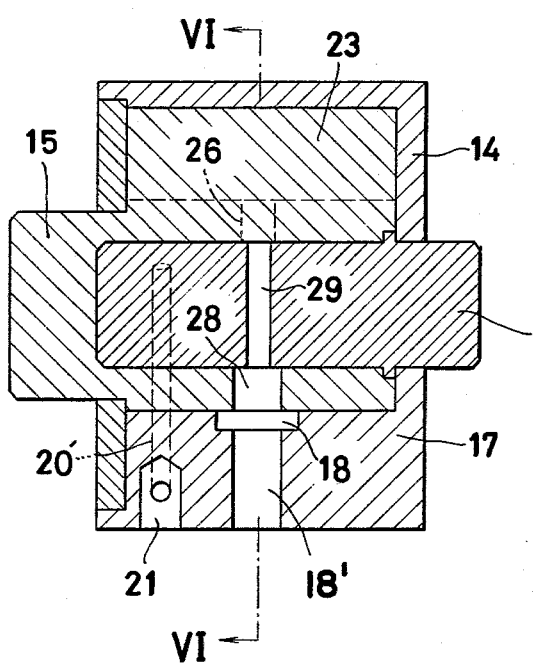
Fig. 5
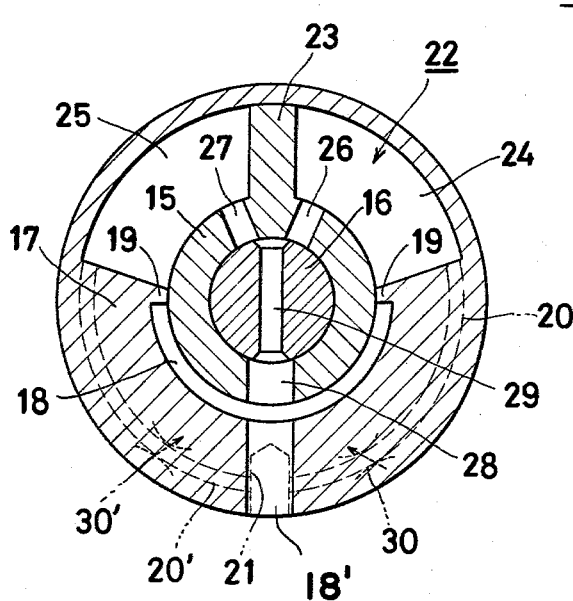
Fig. 6
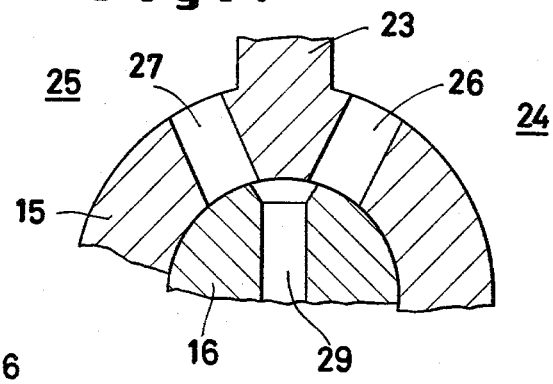
Fig. 7
Fig. 8 (A)
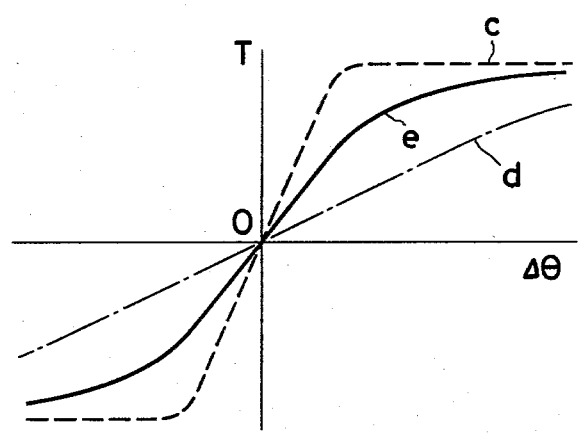
Fig. 8 (B)
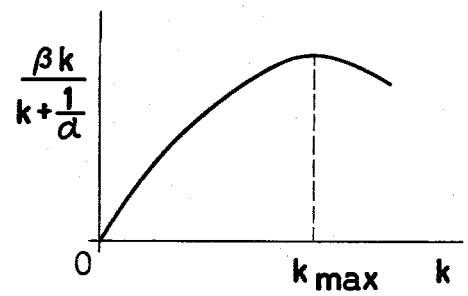

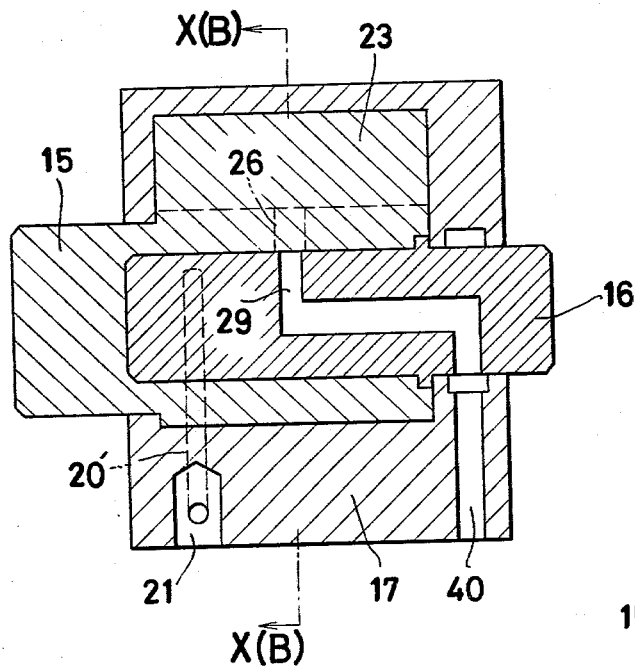
Fig_10 (A)
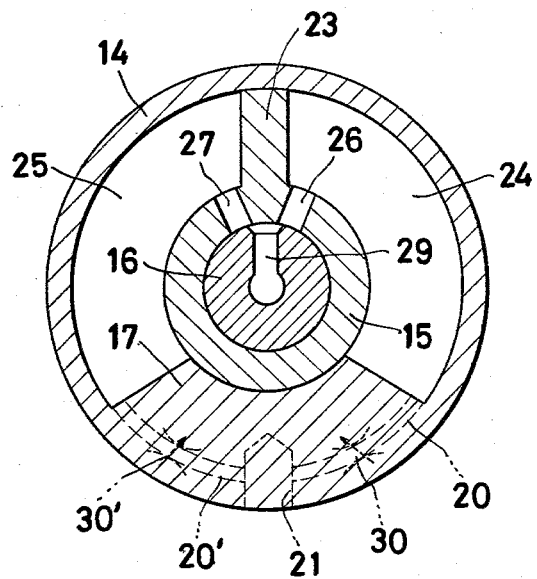
Fig_10 (B)
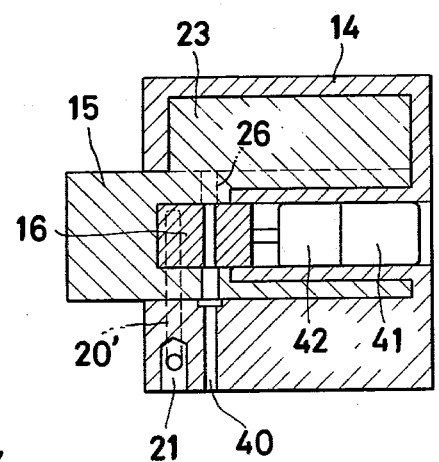
Fig_11

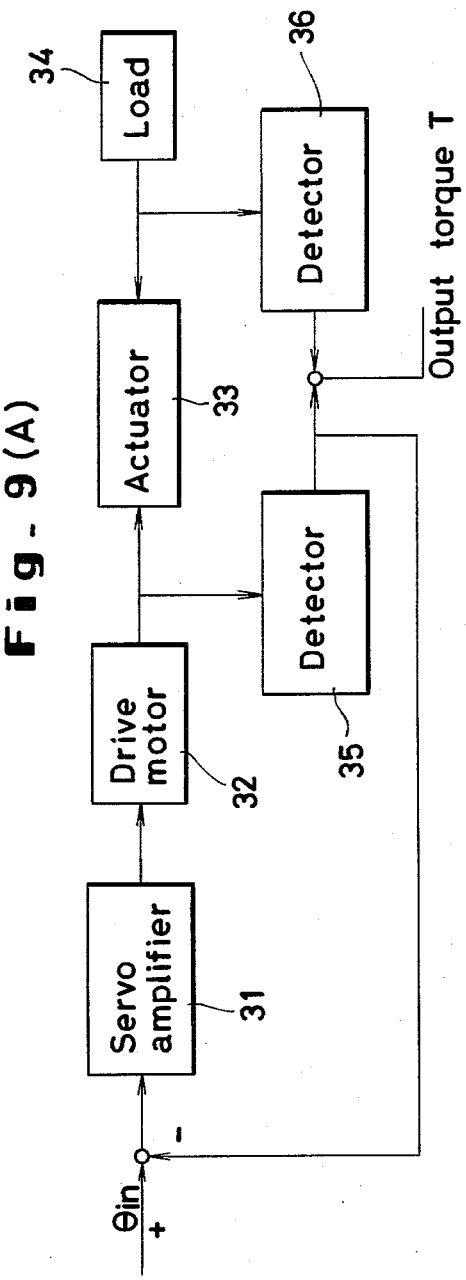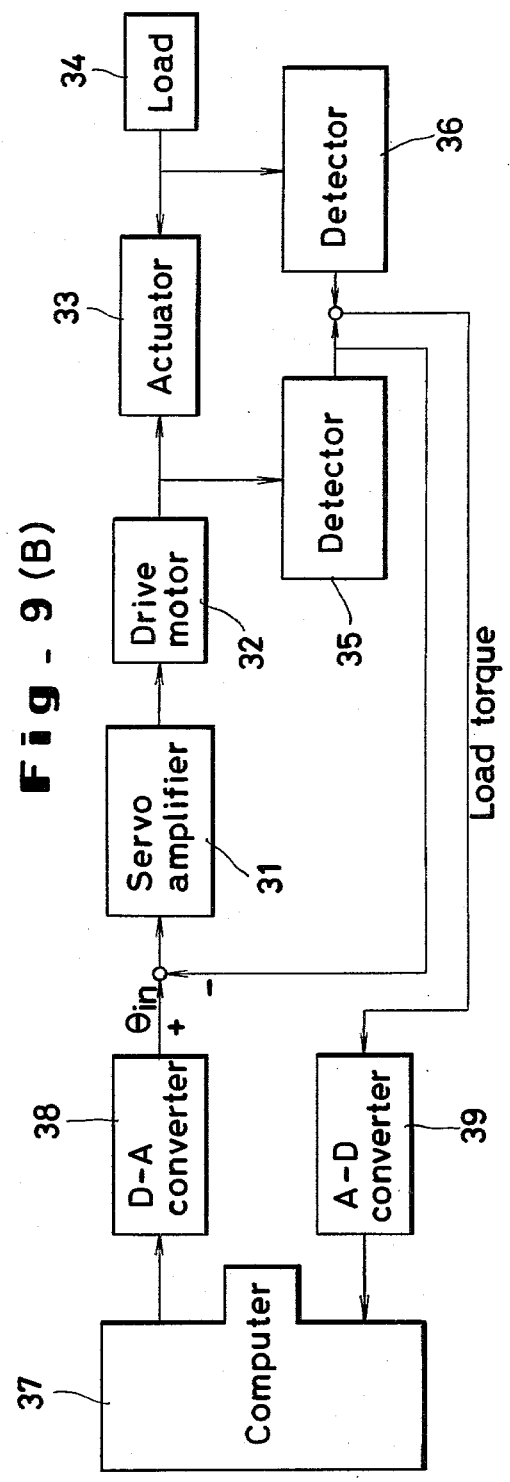

SWING TYPE HYDRAULIC SERVO-ACTUATOR

BACKGROUND OF THE INVENTION

This invention relates to a swing type hydraulic servoactuator. More particularly, this invention relates to a swing type hydraulic servo-actuator which faithfully responds even to a very fine rotary displacement of the input shaft and which permits easy control of the torque of the output shaft.

In recent years, there have been suggested many hydraulic servo-mechanisms adopting the common basic principle of an input shaft and an output shaft each being provided with an oil feeding passage and an oil discharge passage in such a way as to enable the apertures of the passages to be controlled by virtue of the relative rotary displacement between the two shafts and, consequently, permit the rotary motion of the input shaft to be transmitted to the output shaft (such as by U.S. Pat. Nos. 3,858,484 and 3,939,756, Japanese Patent Public Disclosure No. 48373/1975 and Japanese Utility Model Public Disclosure No. 4892/1976, for example).

In these servo-mechanisms of the prior art, however, even if a relative rotary displacement exists between the input shaft and the output shaft, the two shafts may possibly fail to rotate in unison unless the magnitude of the rotary displacement exceeds a certain value, i.e. unless the rotary displacement is large enough to provide communication between the oil feeding passages or between the oil discharge passages. Thus, with the conventional servo-mechanisms, it has been difficult to provide faithful control of fine rotary motion of the output shaft when the shaft is in the neighborhood of its neutral position.

Furthermore, the variation produced in the torque of the output shaft in response to even a very fine rotary displacement occurring between the input shaft and the output shaft is fairly large. This disadvantageous phenomenon has rendered stable control of the torque of the output shaft very difficult.

An object of the present invention is to provide a swing type hydraulic servo-actuator capable of easy control of a very fine rotary motion of the output shaft even when the shaft is in the neighborhood of its neutral position.

Another object of this invention is to provide a swing type hydraulic servo-actuator capable of controlling the output torque of the output shaft by virtue of the relative rotary displacement between the input and output shafts.

Still another object of the present invention is to provide a swing type hydraulic servo-actuator which possesses a simple structure and permits reduction in size.

SUMMARY OF THE INVENTION

To accomplish the objects described above according to the present invention, there is provided a swing type hydraulic servo-actuator which comprises a casing having a hydraulic fluid chamber internally formed therein, a first shaft provided with a vane adapted to divide the hydraulic fluid chamber into two chambers, i.e. a first hydraulic drive chamber and a second hydraulic drive chamber, the vane being adapted to swing inside the hydraulic drive chambers by virtue of static pressures produced in the first and second hydraulic drive chambers, oil feeding passages serving to feed pressurized oil respectively to the first and second hydraulic drive chambers, the oil feeding passages being each provided therein with a variable restrictor, a second shaft coaxially disposed relative to the first shaft, and oil discharge passages for the pressurized oil discharged out of the first and second hydraulic drive chambers, the effective sectional areas of the respective oil discharge passages being adapted to be controlled by virtue of the relative rotary displacement occurring between the first and second shafts. The oil discharge passages mentioned above are adapted so that their effective sectional areas are equal when the first shaft assumes its neutral position relative to the second shaft. When either of the first and second shafts rotates even to a very slight extent, the effective sectional areas of the discharge passages are proportionally varied and the amounts of the presurized oil discharged out of the hydraulic drive chambers are automatically varied. Consequently, the balance maintained so far between the pressures within the two chambers is upset, causing the vane to shift its position and the remaining shaft to rotate and follow the former shaft. This means that the rotation of the output shaft can easily be controlled by the servo-actuator of this invention even when the output shaft is in the neighborhood of its neutral position. Also the control of the output torque which is governed by the relative rotary displacement between the input and output shafts can be accomplished by properly balancing the amounts of the pressurized oil to be fed to the first and second hydraulic drive chambers. Since the input shaft is not required to be provided with any oil feeding passage, the servoactuator of this invention enjoys simplicity of structure, permits reduction in size and offers space enough to incorporate suitable means such as a drive motor for driving the input shaft.

The other objects and characteristics of the present invention will become apparent from the description to be given in detail herein below with reference to the accompanying drawings.

BRIEF EXPLANATION OF THE DRAWING

FIG. 1 is a longitudinal sectional view illustrating a servo-actuator of the prior art.

FIG. 2 is a sectional view taken along the line II—II in FIG. 1.

FIG. 3 is a graph showing the relation between the torque "T" and the displacement "$\Delta\theta$" of the actuator of FIG. 1.

FIG. 4 is a partially enlarged view of the actuator illustrated in FIG. 2.

FIG. 5 is a longitudinal sectional view illustrating a swing type hydraulic servo-actuator as one embodiment of this invention.

FIG. 6 is a sectional view taken along the line VI—VI in FIG. 5.

FIG. 7 is a partially enlarged view of the actuaotr illustrated in FIG. 6.

FIG. 8(A) is a graph showing the relation between the torque "T" and the displacement "$\Delta\theta$" of the actuator of FIG. 5.

FIG. 8(B) is a graph showing the state wherein the coefficient of the displacement "$\Delta\theta$" varies.

FIGS. 9A and 9B are explanatory diagrams of a servo system incorporating therein the servo-actuator of the present invention.

FIGS. 10A, 10B and 11 are explanatory diagrams illustrating other embodiments of the actuator according to the present invention.

DESCRIPTION OF THE PREFERRED EMBODIMENT

Japanese Utility Model Public Disclosure No. 4892/1976, for example, discloses a swing type hydraulic servo-actuator which, as illustrated in FIG. 1 and FIG. 2, comprises a casing 1 embracing therein hydraulic fluid chambers 2, 2', an output shaft 3 having vanes 4, 4' projecting into the casing 1, and an input shaft 5 rotatably set coaxially in the output shaft 3. The input shaft 5 has oil feeding passages 6, oil discharge passages 7 and an oil discharge hole 12' formed therein and the output shaft 3 has oil passages 8, 8' formed therein. The vane 4 of the output shaft 3 is disposed so as to divide the hydraulic fluid chamber 2 of the casing 1 into a first hydraulic drive chamber 9 and a second hydraulic drive chamber 10 and the vane 4' to divide the hydraulic fluid chamber 2' into a first hydraulic drive chamber 9' and a second hydraulic drive chamber 10' respectively. Consequently, between the output shaft 3 and the input shaft 5 there will be formed a valve which opens or closes according to the extent of the relative rotary displacement between the two shafts, namely, the extent to which the oil feeding passages 6 and the oil discharge passages 7 overlap the respective oil passages 8, 8'.

In the hydraulic actuator of such a construction as described above, a counterclockwise rotation of the input shaft 5 causes the oil feeding passage 6 to come to overlie and communicate with the oil passage 8 and the oil discharge passage 7 to come to overlie and communicate with the oil passage 8'. As a result, the actuating fluid such as pressurized oil is forwarded from the oil inlet 11 formed in the casing 1 to the first hydraulic drive chambers 9, 9' via the oil feeding passage 6 and the oil passage 8 respectively. The pressurized oil which has been contained in the second hydraulic drive chambers 10, 10' is passed through the oil passage 8' and the oil discharge passage 7, forwarded via the oil discharge hole 12' and discharged through the oil outlet 12 formed in the casing 1. Consequently, there occurs pressure difference between the first hydraulic drive chambers 9, 9' and the second hydraulic drive chambers 10, 10' and the output shaft 3 rotates counterclockwise to follow the input shaft 5 until this pressure difference is cancelled.

If, in this swing type hydraulic servo-actuator, the input shaft 5 is fixed and a torque "T" is exerted externally upon the output shaft 3, there exists the following relation between the external torque "T" and the relative rotary displacement $\Delta\theta$ produced by this external torque "T" on the output shaft 3 relative to the input shaft 5.

$$T = k\Delta\theta \text{ (k: Constant)}$$

This relation, when plotted in a graph, describes a curve like that of "a" shown in FIG. 3. In the graph of FIG. 3, the horizontal axis is graduated for the relative rotary displacement $\Delta\theta$ between the input shaft and the output shaft and the vertical axis for the torque "T" obtained on the output shaft. From the graph, it is seen that in the operation of this actuator, the constant "k" applicable to the zone in which the torque "T" and the relative rotary displacement $\Delta\theta$ are in direct proportion to each other is fairly large, the curve "a" rises sharply, and the range of the displacement $\Delta\theta$ in the zone of direct proportion is extremely narrow. When the actuator of such nature is incorporated in a servo system of force and operated for the force control, it is difficult to obtain stable force control at a desired value. Even a very small rotary displacement given to the input shaft results in a large variation in the torque "T", giving rise to an oscillation in torque amplitude with the prescribed value at the center. In the fabrication of this actuator, its parts are actually so shaped that overlapping portions 13 occur one each between the oil feeding passage 6 and the oil passage 8 and between the oil discharge passage 7 and the oil passage 8' when the output shaft assumes its neutral position relative to the input shaft, in order that the valve formed between the output and input shafts may be fully closed to shut completely the path for the pressurized oil as shown in FIG. 4. If a relative rotary displacement is produced between the input shaft and the output shaft, no torque acts upon the vanes 4, 4' until the oil feeding passage 6 and the oil discharge passage 7 come to overlie the oil passages 8, 8' respectively. In this case, the relation between the torque "T" and the displacement $\Delta\theta$, when plotted in a graph, describes a curve like that of "b" shown in FIG. 3. It is seen from the curve that near the origin "O" or in the neighborhood of neutral position, the output shaft can not be controlled to rotate in small increments.

The present invention is directed to a swing type hydraulic servo-actuator which is improved so as to preclude the disadvantages described above, permit easy and stable force control, and enable the torque and relative rotary displacement to be proportionally varied even in the neighborhood of neutral position.

Now, the first embodiment of this invention will be described with reference to FIGS. 5 and 6. Within a hollow cylindrical casing 14, an input shaft 16 is rotatably set coaxially in an output shaft 15. Inside the casing 14, a thick-wall portion 17 of the shape of an arc projects inwardly in the radial direction and the inner wall of the thick-wall portion 17 is held in contact fluid-tightly and slidably with the outer surface of the output shaft 15. On the outer surface of the output shaft 15 which is not held in contact with the thick-wall portion 17, a vane 23 is disposed so as to extent outwardly in the radial direction. The leading end of the vane 23 is held in contact fluid-tightly and slidably with the inner wall surface of the casing 14. This means that a hydraulic fluid chamber 22 which is enclosed with the inner wall of the casing 14, the outer wall surface of the output shaft 15 and the end surfaces of the thick-wall portion 17 is divided by the vane 23 into a first hydraulic drive chamber 24 and a second hydraulic drive chamber 25 fluid-tightly. The thick-wall portion 17 is provided with an oil inlet 21 which extends in the radial direction. At its forward portion, the aforementioned oil inlet 21 adjoints the oil feeding passages 20, 20' which are formed in the shape of arcs within the thick-wall portion 17 and allowed to open respectively into the first hydraulic drive chamber 24 and the second hydraulic drive chamber 25. The output shaft 15 is provided, on the opposite sides of the vane 23, with an oil passage 26 communicating with the first hydraulic drive chamber 24 and an oil passage 27 communicating with the second hydraulic drive chamber 25. It is additionally provided, on the side opposite the vane 23, with an oil discharge passage 28. At its outer end, this oil discharge passage 28 opens into a groove 18 which is formed in the shape of an arc in the inner wall of the thick-wall portion 17 and is closed at its opposite extremeties with projections 19.

In the portion of the input shaft 16 which is set fluid-tightly and slidably in the output shaft 15, there is formed an oil discharge passage 29 passing diametrically through the input shaft 16. One end of the oil discharge passage 29 communicates with the oil discharge passage 28 in the output shaft 15. Since the oil discharge passage 28 of the output shaft 15 is considerably larger in cross section than the oil discharge passage 29 of the input shaft 16, the communication between the oil discharge passage 28 and the oil discharge passage 29 is constantly maintained even when there occurs a relative rotary displacement between the input shaft 16 and the output shaft 15. The opening at the other end of the oil discharge passage 29 is so formed that, at the neutral position, the opening communicates, though to a slight extent, with both of the two oil passages 26 and 27 of the output shaft 15, as illustrated in FIG. 7. When there is produced a relative rotary displacement between the input shaft 16 and the output shaft 15, the opening is allowed to retain communication with one or the other of the oil passages 26, 27, depending on the direction of rotation. The oil feeding passages 20, 20' which are formed within the thick-wall portion 17 of the casing 14 are provided each with a variable restrictor 30, (30').

In the swing type hydraulic servo-actuator constructed as described above, when the input shaft 16 and the output shaft 15 are allowed to stand in the neutral position and the pressurized oil from a hydraulic source (not shown) is fed through the oil inlet 21 and, with the volume of flow appropriately adjusted by the variable restrictors 30, 30', flows into the first hydraulic drive chamber 24 and the second hydraulic drive chamber 25, no relative rotary displacement occurs between the two shafts because the hydraulic pressures in the two chambers are equal. The pressurized oil contained in the two chambers passes continuously through the oil passages 26, 27 and is then discharged through the oil discharge passage 29, with which the oil passages 26, 27 retain a small degree of communication, the oil discharge passage 28, the groove 18 and an oil outlet 18' to the outside.

When the input shaft 16 is rotated slightly in the counterclockwise direction from the neutral position, the communication of both the oil passages 26, 27 with the oil discharge passage 29, maintained but the degree of communication of the oil passage 27 with the oil discharge passage 29 becomes greater than that of the oil passage 26 and the amount of the pressurized oil discharged out of the second hydraulic drive chamber 25 becomes greater than that out of the first hydraulic drive chamber 24, with the result that the pressure within the second hydraulic drive chamber 25 decreases and the vane 23 is made to rotate toward the second hydrauric drive chamber side. In this case, if no torque is exerted upon the output shaft 15, the output shaft is caused to rotate and follow the input shaft.

As the counterclockwise rotation of the input shaft 16 is further continued until the oil passage 26 ceases to retain its communication with the oil discharge passage 29, the communication is maintained only between the oil passage 27 and the oil discharge passage 29 and, as a result, the pressurized oil contained in the second hydraulic drive chamber 25 is discharged to the outside through the oil passage 27, the oil discharge passage 29, the oil discharge passage 28, the groove 18 and the oil outlet 31 which penetrates through the casing 14 and communicates with the groove 18. In consequence of this discharge of the pressurized oil, the pressure inside the second hydraulic drive chamber 25 is lowered and the resultant pressure difference between the first hydraulic drive chamber 24 and the second hydraulic drive chamber 25 drives the vane 23, causing the output shaft 15 to rotate in the counterclockwise direction and follow the input shaft 16. This is equivalent to a statement that the output shaft 15 accurately follows the input shaft 16 by virtue of mechanical feedback.

Now the case in which the input shaft 16 is fixed and a torque is exerted externally upon the output shaft 15 is considered. When an external torque "T" acts upon the output shaft 15 in such a way as to cause the output shaft to rotate in the counterclockwise direction, the resultant counterclockwise rotation of the output shaft 15 causes the oil passage 26 and the oil discharge passage 29 to come to communicate with each other and the pressure inside the first hydraulic drive chamber 24 is consequently lowered. As a result, the output shaft 15 is subjected to the torque which originates in the pressure difference produced on the opposite sides of the vane 23. The output shaft 15 is then moved and brought to a stop at the position at which the torque due to the pressure difference is balanced with the external torque "T". The external torque "T", thus, produces a relative rotary displacement $\Delta\theta$ between the input shaft and the output shaft.

Further in the actuator of the present invention, since the oil feeding passages 20, 20' are provided with variable restrictors 30, 30' capable of simultaneously adjusting the amounts of pressurized oil to be fed to the hydraulic drive chambers 24, 25 respectively, the force control of the hydraulic actuator which has heretofore been found difficult can be stably carried out. The function of these variable restrictors will now be described with reference to FIG. 8(A). In the graph of FIG. 8(A), the horizontal axis is graduated for the relative rotary displacement $\Delta\theta$ between the input and output shafts and the vertical axis for the torque "T" of the output shaft. In the operation of the conventional actuator, the relation between the relative rotary displacement $\Delta\theta$ and the torque "T" of the output shaft is such that the zone of proportion is inclined sharply as represented by the curve "a" of FIG. 3, indicating that the control of the output shaft's torque by the relative rotary displacement is extremely difficult. In the case of the actuator according to the present invention, the relation between the relative rotary displacement $\Delta\theta$ and the output shaft's torque "T" can be controlled by properly regulating the apertures in the variable restrictors. To be specific, the slope of the curve representing the relation between the relative rotary displacement $\Delta\theta$ and the torque "T" becomes steep as shown by the curve "c" of the graph of FIG. 8(A) and approaches that of the conventional hydraulic actuator when the amounts of pressurized oil fed to the two hydraulic drive chambers are decreased by reducing the apertures of these variable restrictors 30, 30'. When the apertures of the variable restrictors are increased and consequently the amounts of the pressurized oil fed to the two hydraulic drive chambers are increased, the slope of the curve representing the relation between the relative rotary displacement $\Delta\theta$ and the torque "T" becomes gradual as represented by the curve "d" of the graph of FIG. 8(A).

The effect of the operation just described manifests itself conspicuously when this actuator is used for force control. For example, if the variation in the relative rotary displacement $\Delta\theta$ between the input shaft and the output shaft remains constant, the variation in the torque "T" is large where the apertures of the variable restrictors are decreased but the variation is small where the variable restrictors are fully opened. This means that the torque "T" can easily be controlled by properly adjusting the apertures of the variable restrictors and the relative rotary displacement $\Delta\theta$ between the two shafts.

Now the effect of the apertures of the variable restrictors upon the relation between the relative rotary displacement $\Delta\theta$ and the torque "T" will be described.

Let $P_s$ stand for the oil pressure of the hydraulic source, $P_d$ for the oil pressure of the oil discharge passage 29 and $Q_1$ and $Q_2$ respectively for the flow volumes of the pressurized oil in the first hydraulic drive chamber 24 and the second hydraulic drive chamber 25 regulated by varying the aperture of the valve formed by the oil discharge passage 29 and the oil passages 26, 27 between the input shaft and the output shaft, and the pressure losses $\Delta P_1$ and $\Delta P_2$ produced by the variable restrictors 30, 30' will be represented by the following equations.

$$\Delta P_1 = kQ_1, \; \Delta P_2 = kQ_2$$

The pressures $P_1$ and $P_2$ within the hydraulic drive chambers 24, 25 will, then, be represented as follows:

$$P_1 = P_s - \Delta P_1 = P_s - kQ_1 \quad (1)$$

$$P_2 = P_s - \Delta P_2 = P_s - kQ_2 \quad (2)$$

Owing to the valve formed between the input and output shafts, the flow volumes $Q_1$ and $Q_2$ satisfy the following equations.

$$Q_1 = C(x + r\theta)\sqrt{2(P_1 - P_d)/\rho} \quad (3)$$

$$Q_2 = C(x - r\theta)\sqrt{2(P_2 - P_d)/\rho} \quad (4)$$

wherein, "C" denotes the width in the axial direction of the valve formed between the input and output shafts, "x" the aperture of the valve in the neutral position, "r" the radius of the input shaft, "$\theta$" the relative rotary displacement of the input and output shafts from the neutral position and "$\rho$" the density of the oil.

Since $P_1 = P_2 = P^*$ and $Q_1 = Q_2 = Q^*$ are satisfied in the neutral position, there ensue the following equations.

$$P^* = P_s + K/2 - \sqrt{(P_s + K/2)^2 - (P_s^2 + K \cdot P_d)}$$

$$Q^* = C \cdot x \sqrt{2(P^* - P_d)/\rho}$$

wherein, $K = 2k^2 C^2 x^2 / \rho$

Now, on the assumption that the input and output shafts have produced a very fine relative rotary displacement $\Delta\theta$ from the neutral position, the relation between the output torque "T" and the relative rotary displacement $\Delta\theta$ will be calculated. When the equations of (1) and (3) and those of (2) and (4) are paired to eliminate $Q_1$ and $Q_2$ respectively and the displacement $\Delta\theta$ is very small, there are derived the following equations.

$$P_1 = P^* - \frac{k \cdot C \cdot r \sqrt{2(P^* - P_d)/\rho}}{\frac{k \cdot C \cdot x \cdot \rho}{\sqrt{2(P^* - P_d)/\rho}} + 1} \cdot \Delta\theta$$

$$P_2 = P^* + \frac{k \cdot C \cdot r \sqrt{2(P^* - P_d)/\rho}}{\frac{k \cdot C \cdot x \cdot \rho}{\sqrt{2(P^* - P_d)/\rho}} + 1} \cdot \Delta\theta$$

Let "A" stand for the area of the vane 23 which is concerned with the output torque "T" and the output torque T will be represented as follows.

$$T = A(P_2 - P_1)$$
$$= \frac{2 \cdot k \cdot C \cdot r \cdot A \sqrt{2(P^* - P_d)/\rho}}{\frac{k \cdot C \cdot x \cdot \rho}{\sqrt{2(P^* - P_d)/\rho}} + 1} \cdot \Delta\theta$$
$$= \frac{\beta k}{k + \frac{1}{\alpha}} \cdot \Delta\theta$$

(wherein, $\alpha$ is represented by a function of $P^*$, $\sqrt{2(P^* - P_d)/\rho}/(C \cdot x \cdot \rho)$ and $\beta$ by a function of $P^*$, ($4 \cdot r \cdot A / x \cdot \rho 2$) ($P^* - P_d$).) Since $P^*$ is represented by a function of "k", the coefficient of the displacement $\Delta\theta$ is varied by the factor "k" of the variable restrictor as shown in the graph of FIG. 8(B). A perpendicular line is drawn relative to the horizontal axis of FIG. 8(B) from the peak of the graph and an intersection point of the perpendicular line and the horizontal axis is referred to as "$k_{max}$". The factor "k" is varied in the range of from "0" to "$k_{max}$". The nearer the factor "k" approaches "0" (namely, the wider the variable restrictor is opened), the nearer the curve "e" in FIG. 8(A) approaches the curve "d" and variation in output torque becomes smaller. To the contrary, the nearer the factor "k" approaches "$k_{max}$" (namely, the more narrowly the variable restrictor is closed), the nearer the curve "e" approaches the curve "c" and variation in output torque becomes larger.

More specifically, each of the oil feeding passages communicating with the hydraulic drive chambers is provided with a variable restrictor and two valve operational sections composed of input and output shafts in which sections pressure descents occur. The pressure descents in the case of one of the hydraulic drive chamber are represented by $P_s - P_1$ and $P_1 - P_d$ respectively. Those in the case of the other hydraulic drive chamber are represented by $P_s - P_2$ and $P_2 - P_d$ respectively. The sum of the pressure descents in each case is $P_s - P_d$. The sum is constant in any case. The ratio of the pressure descents in each case is varied by varying the restricting degree of the variable restrictor. The output torque is in proportion to "$P_1 - P_2$".

Even if load torque is varied when the input shaft is fixed, the relative rotary displacement $\Delta\theta$ between the input and output shafts can be maintained constant by regulating the restricting degree of the restrictor. The regulation allows the displacement to be maintained constant and the output torque to be varied. This results from a combination of the following.

(1) The variation in restricting degree of the restrictor causes an average amount of oil for flowing through the two oil passages and an average ratio of the pressure descents occurred in the two oil passages to be varied. (In case where the restrictor is closed, the value of "k" becomes large and the resistance to oil in the oil passages becomes large, with the result that the average amount of oil becomes small.)

(2) The variation in restricting degree of the restrictor causes the ratio of the amounts of oil flowing through the two oil passages and the ratio of the corresponding pressure descents in the two oil passages to be varied. Accordingly, the ratio of the pressure descents in each oil passage is varied.

Accordingly, when the restricting degree is varied in the range of from "0" to "$k_{max}$", the smaller the degree the smaller the output torque relative to the constant $\Delta\theta$, and the larger the degree the larger the output torque.

In the actuator according to the present invention, it is plain from the foregoing description that the pressurized oil is always discharged out of the first hydraulic drive chamber and/or the second hydraulic drive chamber whenever the input shaft and the output shaft form any angle of rotation relative to each other. If the formed angle of rotation is varied even very slightly, therefore, this variation of the angle causes a variation in the flow volumes of pressurized oil, with the result that the output shaft is made to rotate and follow the input shaft. Besides, the output torque "T" can be easily controlled by regulating the flow volumes of pressurized oil fed to the first and second hydraulic drive chambers and consequently adjusting the relative rotary displacement between the input and output shafts. It follows that the torque "T" is immediately varied when there is produced any relative rotary displacement $\Delta\theta$ between the two shafts and the torque "T" can be controlled by the rotary displacement $\Delta\theta$. By this reason, the force control in the force servo system can be obtained stably without entailing any possibility of oscillation or other similarly undesirable phenomena when the system incorporates the actuator of the present invention as illustrated in FIG. 9.

FIG. 9(A) represents one embodiment of the actuator of this invention used in controlling the output torque exerted on the load. In the system illustrated, the signal $\theta_{in}$ of the rotary displacement of the input shaft to be rotated is amplified by a servo amplifier 31 and applied to an input shaft drive motor 32. The drive motor 32 causes the input shaft of the actuator 33 to rotate by an angle corresponding to the value of the applied signal. By the rotation caused in the output shaft as described above, the output shaft upon which the load 34 is applied rotates in response to said rotation. The rotary displacement of the input shaft and that of the output shaft are detected respectively by rotary displacement detectors 35, 36 and the values thus detected by the detectors are compared, giving rise to an output torque "T". In the meantime, the value of rotary displacement of the input shaft detected by the detector 35 is always fed back and compared with the signal $\theta_{in}$ of the input rotary displacement and the signal of the error resulting from this comparison is amplified by the servo amplifier 31 and applied to the drive motor 32 to cause the input shaft of the actuator 33 to be rotated. In this manner, the position of the input shaft can be controlled and the output torque can be estimated.

FIG. 9(B) represents another embodiment of the present invention used in controlling, through the medium of an electronic computer, the output torque applied to the load. From an electronic computer 37, there is issued a digital numerical value as a command designating the position of the input shaft. This digital value is converted into an analog signal $\theta_{in}$ by means of a D-A converter 38 and then amplified and processed by the servo amplifier 31 and thereafter used to rotate the input shaft drive motor 32. The rotation of the input shaft of this actuator 33 is detected by the rotary displacement detector 35 and fed back to the input of the servo amplifier 31. The designated value $\theta_{in}$ and the value of rotary displacement of the input shaft thus fed back are compared, and the signal of the error resulting from this comparison is fed to the servo amplifier 31 to control the position of the input shaft of the actuator 33. By virtue of mechanical feed, the output shaft of the actuator 33 is rotated to follow the input shaft. At the point at which the load torque 34 and the output torque are perfectly balanced, the input and output shafts are brought to a stop at positions involving a relative rotary displacement determined by the output torque. The rotations of the input and output shafts are determined by means of the respective rotary displacement detectors 35, 36, and the difference between the two rotations is converted into a digital numerical value by the A-D converter 39 and the digital value is fed back, as an output torque, to the computer 37. When the output torque thus received differs from the predetermined torque, the computer effects a correction in the digital value of command for the rotation of the input shaft so as to equalize the output torque with the predetermined torque. In this case, the variable restrictor produces an effect as follows. As increase in the aperture of the restrictor serves to effect correction of the rotary displacement $\Delta\theta$ as shown by the curve "d" of the graph of FIG. 8(A), making possible the fine control of the torque "T". When the aperture of the restrictor is decreased the torque "T" is caused to vary widely even for a very small rotary displacement $\Delta\theta$ as in the case of the ordinary hydraulic actuator. Ordinarily, fine control of the angle of rotation of the input shaft frequently proves to be difficult because of play and other similar mechanical defects. Where the torque "T" is varied widely for a very small rotary displacement $\Delta\theta$ as described above, stable torque control cannot be realized. Where the torque control is desired to be obtained stably, the aperture of the restrictor must be increased. The adjustment of the aperture depends on the hardness or softness of the load applied (by assuming the load to be hard where a given displacement is obtained by application of a large magnitude of force and soft when the same displacement is obtained by application of a small magnitude of force). Desirably, the displacement and output torque characteristics proper to the load being used should be selected by decreasing the aperture where the load is hard or increasing the aperture when the load is soft.

In the first embodiment, the range over which the vane 23 of the output shaft 15 enjoys freedom of rotary movement is limited by the thick-wall portion 17 of the casing 14. Where this range in which the vane 23 can be freely rotated is desired to exceed 180°, the desired increase of the range can be accomplished as shown in FIGS. 10(A) and 10(B) by giving the thick-wall portion 17 such dimensions as are barely enough to devide the hydraulic drive chambers 24 and 25 and causing an oil discharge passage 40 adapted to communicate with the oil discharge passage 29 of the input shaft 16 to be formed in the axial direction within the input shaft 16.

In the actuator of the present invention, the output of displacement is obtained by the output shaft following the input shaft and producing a rotary displacement and the output of force is obtained by the output shaft producing a relative rotary displacement with reference to the input shaft as described in detailed above. When this actuator is used such as in a joint of a robot, for example, a given force applied to bear on the joint can be detected by imparting a displacement as an input to the actuator and detecting a relative rotary displacement produced between the output shaft and the input shaft. When the actuator is used in a grip in the forward portion of a hand in the robot, the robot's hand can grip a given object with a desired force by controlling the input shaft so that the relative rotary displacement between the input and output shafts will be maintained at a fixed value. The softness of this grip can be realized by properly decreasing the slope of the curve of T-Δθ through the adjustment of the variable restrictors.

Compared with the actuator of a construction like the one illustrated in FIG. 1 and FIG. 2, the actuator of the present invention enjoys an advantage that the construction is simple because the pressurized oil being supplied from the hydraulic source to the hydraulic drive chambers does not pass through the input shaft. Thus, the length of the input shaft 16 can be reduced as illustrated in FIG. 11. The space thus saved may be used for incorporation of an input shaft drive motor 41, a speed reducer 42, etc, permitting the whole system to be further reduced in size.

What is claimed is:

1. A swing type hydraulic servo-actuator which comprises
   (a) a casing defining an oil chamber,
   (b) a first shaft having a vane extending into the oil chamber and dividing the oil chamber into a first drive chamber and a second drive chamber,
   (c) oil feeding passages arranged to feed oil under pressure respectively to the first and second drive chambers,
      (1) the vane being adapted to swing inside the oil chamber from the neutral position under respective static pressures produced by the oil fed into the first and second drive chambers,
   (d) a variable restrictor in each oil feeding passage for adjusting the pressure, the variably restrictors simultaneously adjusting the amounts of oil fed under pressure to the drive chambers,
   (e) a second shaft disposed coaxially relative to the first shaft, one of the shafts being rotatably displaceable relative to the other shaft, and
   (f) oil discharge passages respectively in communication with the first and second drive chambers when the first shaft is in the neutral position relative to the second shaft for discharging the oil from the drive chambers,
      (1) the oil flow through the discharge passages being controlled by the relative rotary displacement between the shafts so that the oil flow through one of the discharge passages in communication with one of the drive chambers increases proportionally to a decrease in the oil flow through the other discharge passage in communication with the other drive chamber.

2. The servo-actuator of claim 1, wherein the casing defines the oil feeding passages.

3. A swing type hydraulic servo-actuator which comprises
   (a) a cylindrical casing defining an oil chamber and including (1) a radially thickened wall segment,
   (b) a first shaft coaxially journaled in the casing in fluid-tight and gliding contact with the thickened wall segment, the first shaft including
      (1) a vane extending into the oil chamber and dividing the oil chamber into a first drive chamber and a second drive chamber,
   (c) oil feeding passages defined by the thickened wall segment of the casing and arranged to feed oil under pressure respectively to the first and second drive chambers,
      (1) the vane being adapted to swing inside the oil chamber from a neutral position under respective static pressures produced by the oil fed into the first and second drive chambers,
   (d) a variable restrictor in each oil feeding passage for adjusting the pressure, the variable restrictors simultaneously adjusting the amounts of oil fed under pressure to the drive chambers,
   (e) a second shaft rotatably received in an axial bore of the first shaft and disposed coaxially relative to the first shaft, one of the shafts being rotatably displaceable relative to the other shaft,
   (f) oil discharge passages respectively in communication with the first and second drive chambers when the first shaft is in the neutral position relative to the second shaft for discharging the oil from the drive chambers,
      (1) the oil discharge passages being radial bores in the first shaft arranged on either side of the vane, and
      (2) the oil flow through the discharge passages being controlled by the relative rotary displacement between the shafts so that the oil flow through one of the discharge passages in communication with one of the drive chambers increases proportionally to a decrease in the oil flow through the other discharge passage in communication with the other drive chamber, and
   (g) a diametrically extending oil discharge bore in the second shaft, the diametrically extending oil discharge bore having
      (1) one end slightly overlapping the radial oil discharge bores in the neutral position of the first shaft.

4. The servo-actuator of claim 3, further comprising an additional oil discharge passage in the first shaft, in registry with an opposite end of the oil discharge bore, the additional oil discharge passage being considerably larger in cross section than the diametrically extending oil discharge bore for maintaining communication between the oil discharge bore and the additional oil discharge passage during a relative rotary displacement between the shafts.

* * * * *